(12) United States Patent
Wei et al.

(10) Patent No.: US 12,399,384 B2
(45) Date of Patent: Aug. 26, 2025

(54) OPHTHALMIC LENS FOR PREVENTING MYOPIA PROGRESSION AND EYEGLASSES USING SAME

(71) Applicant: MDCO TECHNOLOGY LIMITED, Hangzhou (CN)

(72) Inventors: Xin Wei, Hangzhou (CN); Zhenhua Song, Hangzhou (CN)

(73) Assignee: MDCO TECHNOLOGY LIMITED, Hangzhou (CN)

( * ) Notice: Subject to any disclaimer, the term of this patent is extended or adjusted under 35 U.S.C. 154(b) by 413 days.

(21) Appl. No.: 18/112,814

(22) Filed: Feb. 22, 2023

(65) Prior Publication Data
US 2023/0350226 A1 Nov. 2, 2023

(30) Foreign Application Priority Data
Apr. 29, 2022 (CN) .......................... 202210494032.6

(51) Int. Cl.
*G02C 7/02* (2006.01)
(52) U.S. Cl.
CPC .......... *G02C 7/022* (2013.01); *G02C 2202/24* (2013.01)
(58) Field of Classification Search
None
See application file for complete search history.

(56) References Cited

U.S. PATENT DOCUMENTS 8,241,354 B2 * 8/2012 Hong ..................... G02C 7/042
623/6.27
10,871,659 B2 * 12/2020 Hong ..................... A61F 2/164

FOREIGN PATENT DOCUMENTS

| CN | 109407342 A | 3/2019 |
| CN | 111830731 A | 10/2020 |
| CN | 112068331 A | 12/2020 |
| CN | 113693780 A | 11/2021 |

OTHER PUBLICATIONS

Extended European Search Report mailed Sep. 25, 2023 in European Application No. 23158898.9, 8 pages.
Chinese Office Action mailed Jun. 9, 2023 in Chinese Application No. 202210494032.6, with English summary, 6 pages.

* cited by examiner

*Primary Examiner* — Darryl J Collins
(74) *Attorney, Agent, or Firm* — Nixon & Vanderhye P.C.

(57) ABSTRACT

The present disclosure relates to an ophthalmic lens for preventing progression of myopia and to spectacles with the ophthalmic lens. At least one surface of the ophthalmic lens is defined by a superposition of a base sag profile and a perturbation sag profile, and the perturbation sag profile is defined as a product of a first subfunction for defining a perturbation characteristic sag and a weighting function for weighting the first subfunction. As a result, the visual fatigue caused by ghosting to myopic patients can be avoided or significantly reduced while preventing or controlling the progression of myopia, thereby effectively improving the wearing visual experience of myopic patients.

13 Claims, 4 Drawing Sheets

OPHTHALMIC LENS FOR PREVENTING MYOPIA PROGRESSION AND EYEGLASSES USING SAME

CROSS-REFERENCE TO RELATED PATENT APPLICATION

This application claims the benefit of and priority to Chinese Patent Application No. 202210494032.6 filed on Apr. 29, 2022, the entire disclosure of which is incorporated by reference herein.

TECHNICAL FIELD

The present disclosure relates to vision correction technologies, in particular to an ophthalmic lens for preventing progression of myopia, and spectacles with the ophthalmic lens.

BACKGROUND

In recent years, with the popularization of personal computers and mobile phones, myopia has become a common vision disorder worldwide at an increasing prevalence rate. In some countries, especially in Asia, the prevalence rate of myopia among school-age children has even reached 80%.

In order to perceive an image clearly, the image is required to be focused on the retina of the optical system of the human eye, especially on the fovea of the retina. Myopia (also known as nearsightedness) is a vision disorder of the eye in which an on-axis image is focused in front of the fovea. For myopic patients, distant objects look blurry because images of the objects are focused in front of the fovea of the retina rather than on the fovea, and thus the distant objects can only be seen clearly by the myopic patients under certain forms of optical correction.

Figure 1:
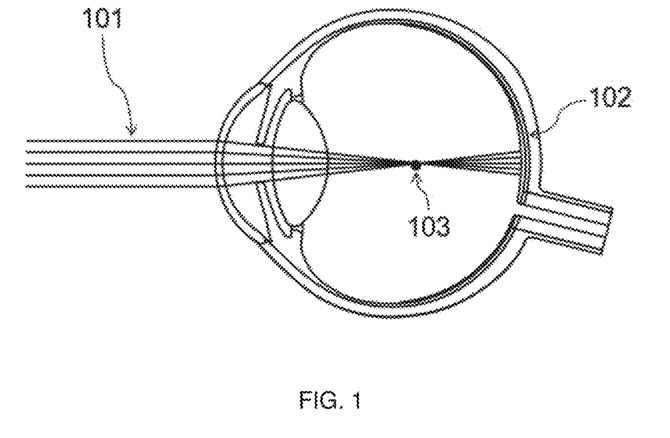
FIG. 1 is a schematic diagram illustrating a principle of myopia.
Figure 2:
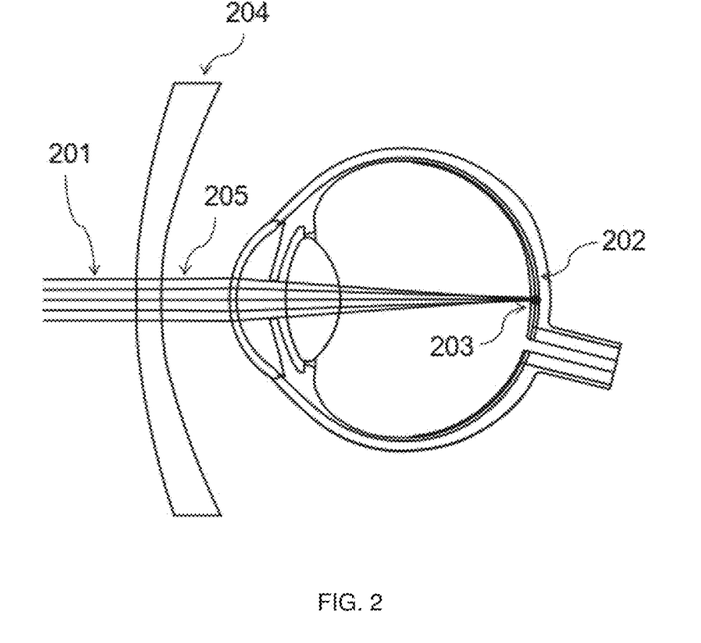
FIG. 2 is a schematic diagram illustrating a myopia correction mechanism.

FIG. 1 is a schematic diagram illustrating the principle of myopia. As shown in FIG. 1, due to a mismatch between the refractive power of an eye of a myopic patient and the axial length of the eye, the focal point 103 at which parallel light rays 101 passing through the optical system of the eye from a distant object converge is positioned in front of the retina 102. FIG. 2 is a schematic diagram illustrating a myopia correction mechanism. As shown in FIG. 2, a concave lens 204 is added in the visual optical path of the eye, such that the parallel light rays 201 from the distant object become divergent light rays 205 after passing through the concave lens 204. Then, the divergent light rays 205 are focused onto the retina 202 after passing through the optical system of the eye, thereby forming a clear focus 203.

Myopia is known to progress regardless of the age of onset (that is, the degree of myopia increases over time). The high myopia may lead to an increased risk of retinopathy (including retinal detachment), cataracts and glaucoma.

Studies have shown that myopia correction using traditional monofocal (i.e., single focal point) lenses may accelerate the progress of myopia, especially in developing children. Such monofocal lenses are only intended to fully correct central vision or foveal vision for distant objects; and when the wearer is indoors and gazing at a near object, the clear image signal generated by the near object may be positioned behind the retina according to the theory of accommodation lag or peripheral defocus, such that a neurophysiological signal that triggers axial elongation of the eye is generated.

In this regard, Chinese patent applications CN104678572A and CN111095082A have disclosed lenses for suppressing the progression of myopia. In CN104678572A, the lens is divided into two refractive regions, a first one of which corresponds to a prescription portion for providing a first refractive power for prescription correction of a refractive error of a patient's foveal vision under standard conditions, and a second one of which has a different refractive power from the first region for focusing images at positions other than the retina to thereby suppress the progression of myopia. In CN111095082A, the lens also includes a corresponding first refractive correction portion for correcting a refractive error of a patient's foveal vision. However, CN111095082A differs from CN104678572A in that at least three different optical elements are provided to focus images at positions other than the retina to thereby suppress or slow down the progression of myopia.

However, since the lens in the prior art is divided into at least two different refractive regions or elements with respective different refractive powers, ghost images may often appear on the retinas of the myopic patients when they look at near objects, which not only causes visual fatigue but also affects the time for which myopic patients wear such spectacles (e.g., removing the spectacles more frequently due to the visual fatigue), thereby affecting the efficacy in suppressing or slowing down the progression of myopia.

SUMMARY

The present disclosure is intended to provide an improved ophthalmic lens for preventing progression of myopia and spectacles with the ophthalmic lens, so as to solve at least the aforesaid and other technical problems existing in the prior art.

An aspect of the present disclosure provides an ophthalmic lens for preventing progression of myopia, including: an optical unit that includes a first surface and a second surface both centered by an optical axis and opposed to each other, where at least one of the first surface and the second surface is defined by a superposition of a base sag profile and a perturbation sag profile, and the perturbation sag profile is defined by:

$$Z_{perturbation}(x,y) = \text{Sag}(x,y) \times \text{Weight}(x,y)$$

where x and y refer to x and y coordinate values of each point on the at least one surface on a Cartesian coordinate system that takes the optical axis as a z-axis, respectively; $Z_{perturbation}(x, y)$ refers to a perturbation sag of said each point; Weight(x, y) refers to a perturbation weight of said each point; and Sag(x, y) refers to a perturbation characteristic sag of said each point and is defined by:

$$\text{Sag}(x,y) = H \cdot Z_p^{1D}(x) \cdot Z_p^{1D}(y)$$

where H refers to an adjustment parameter for perturbation amplitudes; and a mathematical expression of a function $Z_p^{1D}(\ )$ is:

$$Z_p^{1D}(\delta) = \frac{\text{sign}\left(\sin\left(\frac{\pi\delta}{T}\right)\right)+1}{2} \int_0^{\rho(\delta)} \text{sign}\left(\sin\left(\frac{\pi\delta}{T}\right)\right) \cdot C(-\rho(\delta)) \cdot \rho(\delta) \cdot d\delta +$$

$$\frac{-\text{sign}\left(\sin\left(\frac{\pi\delta}{T}\right)\right)+1}{2} \int_0^{\rho(\delta)} -\text{sign}\left(\sin\left(\frac{\pi\delta}{T}\right)\right) \cdot C(\rho(\delta)) \cdot \rho(\delta) \cdot d\rho\delta$$

where δ refers to an independent variable of $Z_p^{1D}(\ )$; sin( ) refers to a sinusoidal function; sign( ) refers to a symbolic function; T refers to a spatial period of perturbation; ∫ refers to an integral sign; and d refers to a differential sign; ρ(δ) is defined by:

$$\rho(\delta) = \frac{\delta}{T} - \left\lfloor \frac{\delta}{T} \right\rfloor$$

where ⌊ ⌋ refers to a floor function;
a mathematical expression of a function C( ) is:

$$C(\sigma) = k \cdot \left[ w^2 \cdot \sigma^{\frac{2}{\gamma}} / \varepsilon^4 - 1/\varepsilon^2 \right] \cdot e^{\frac{w^2 \cdot \sigma^{\frac{2}{\gamma}}}{2\varepsilon^2}}$$

where σ refers to an independent variable of C( ); k refers to a magnitude of an amplitude for controlling an integral kernel in the function $Z_p^{1D}()$; w, γ and ε refer to parameters for controlling relative positions and relative amplitudes of peaks and valleys in a profile defined by Sag(x, y); and e refers to a natural constant.

In some embodiment, $$\text{Weight}(x, y) = 0.5 \cdot \tanh\left[\frac{\sqrt{x^2+y^2}-a}{b}\right] - 0.5 \cdot \tanh\left[\frac{\sqrt{x^2+y^2}-c}{d}\right],$$

where tanh( ) refers to a hyperbolic tangent function; and a, b, c and d are parameters for controlling the perturbation weight.

In some embodiment, H falls within a value range from 5 μm to 10 μm, T falls within a value range from 0.8 mm to 2 mm, k falls within a value range from −2 to 2, w falls within a value range from 3 to 7, γ falls within a value range from 0.1 to 1, and ε falls within a value range from 0.8 to 1.2.

In some embodiment, a falls within a value range from 0.5 to 5, b falls within a value range from 0.5 to 4, c falls within a value range from 10 to 20, and d falls within a value range from 0.5 to 4.

In some embodiments, the base sag profile appears spherical or aspherical.

In some embodiments, a profile of the at least one surface is defined by $Z(x, y) = Z_{base}(x, y) + Z_{perturbation}(x, y)$, where Z(x, y) refers to a surface sag of said each point, and $Z_{base}(x, y)$ refers to a base sag of said each point and is defined by $$Z_{base}(x, y) = \frac{vr^2}{1+\sqrt{1-(1+k)cv^2r^2}} + a_4 r^4 + a_6 r^6,$$

where r refers to $\sqrt{x^2+y^2}$ serving as a radial distance from the optical axis; v refers to a base curvature of a corresponding surface; k refers to a cone constant; and $a_4$ and $a_6$ refer to a fourth order coefficient and a sixth order coefficient, respectively.

In some embodiments, the base sag profile appears spherical when k, $a_4$ and $a_6$ are all zero.

In some embodiments, the optical unit has a base diopter for correcting myopia of a wearer.

In some embodiments, the first surface is substantially convex, and the second surface is substantially concave.

In some embodiments, one of the first surface and the second surface is defined by a superposition of the base sag profile and the perturbation sag profile, and the other is defined only by another base sag profile.

In some embodiments, the ophthalmic lens is adapted to be disposed on a spectacle lens.

Another aspect of the present disclosure provides spectacles, including a spectacle frame and a spectacle lens fitted to the spectacle frame, where the spectacle lens uses an ophthalmic lens according to the aforesaid aspect.

In some embodiments, the first surface is a front surface, and the second surface is a rear surface.

Compared with the prior art, the ophthalmic lens for preventing progression of myopia according to the present disclosure has no specific division in regions, and its optical design lies at least in the perturbation based on a special continuous surface function. By reasonably selecting the perturbation spatial period, perturbation amplitudes, and sizes and relative positions of peaks and valleys for the perturbation function, a competing defocus signal can be generated for the retinal nerve, and the ghost images occurring in the myopic patients when they look at near objects can also be significantly reduced. As a result, the visual fatigue caused by the ghost images to myopic patients can be avoided or significantly reduced while suppressing or slowing down the progression of myopia, thereby effectively improving the wearing visual experience of myopic patients.

It should be noted that the aforesaid description is only an overview of the present disclosure for facilitating better understanding of technical solutions of the present disclosure such that the present disclosure may be implemented in accordance with those described in the specification. Embodiments of the present disclosure will be detailed below in conjunction with the accompanying drawings to make the above and other objects, features, and advantages of the present disclosure more clearly understood.

It will be understood by those skilled in the art that the aforesaid accompanying drawings are for illustrative purposes only and are not intended to limit the scope of the present disclosure in any way.

DETAILED DESCRIPTION

It shall be understood that the present disclosure simplifies the accompanying drawings and description to illustrate the components of the present disclosure in a manner that is helpful for a clear understanding, and other components visible in a typical ophthalmic lens are not shown for the sake of clarity and brevity. Accordingly, one of ordinary skill in the art shall understand that other components are desirable and/or needed in implementing the present disclosure. Because such components are well known in the art and may not be conducive to a better understanding of the present disclosure, no description of such components is provided in the present disclosure. The present disclosure is intended to cover all changes and variations based on components known to those skilled in the art.

In the ophthalmic lens for preventing progression of myopia according to an embodiment of the present disclosure, a perturbation based on a special continuous surface function is applied onto a spherical or aspherical base surface profile (e.g., corresponding to a myopic prescription area of a conventional optical spectacle lens). A perturbation is applied on a clear focus point formed on the retina after light rays sequentially pass through the ophthalmic lens defined by the perturbation function and the wearer's eye. The perturbed focus point may generate a competing defocus signal for the retinal nerve while imaging in high resolution on the retina, which may prevent or slow down the axial elongation of the eye and thereby suppress or slow down the progression of myopia. Compared to the prior art for suppressing the progression of myopia, the ophthalmic lens according to the present disclosure not only can suppress or slow down the progression of myopia but also can prevent or significantly reduce the visual fatigue caused by the ghost images appearing when looking at near, thereby effectively improving the wearing visual experience of myopic patients.

Terms, such as "above", "below", "horizontal", "longitudinal", "front", "rear" and the like as used herein for indicating relative orientation shall be understood in the context of the conditions under which the ophthalmic lens is worn.

The term "ophthalmic lens" herein may refer to an uncut optical lens or a spectacle lens that is rimmed to fit a particular spectacle frame or an optical device adapted to be disposed on a spectacle lens. The optical device may be disposed on the front or rear surface of the spectacle lens, and may be an optical patch. The optical device may be configured to be removably disposed on the spectacle lens, and may for example be configured with a clip for clipping onto a spectacle frame with the spectacle lens.

Figure 3A:
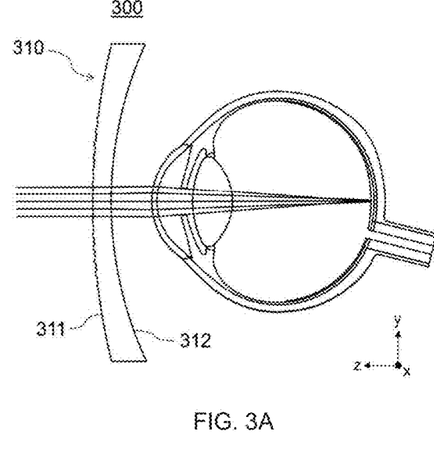
FIGS. 3A and 3B are a cross-sectional view and a plan view, respectively, of an ophthalmic lens 100 according to some embodiments of the present disclosure.
Figure 3B:
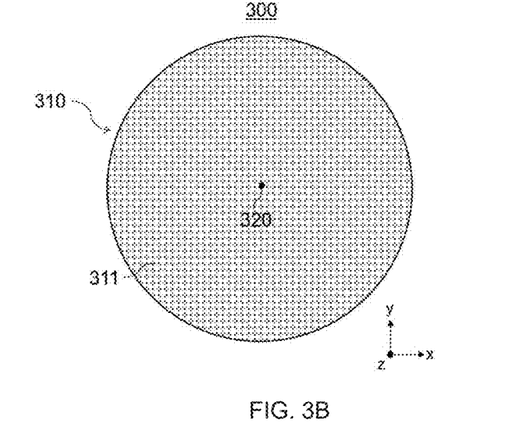
Figure 3C:
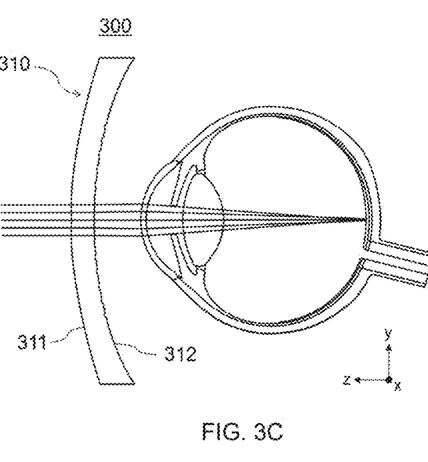
FIGS. 3C and 3D are a cross-sectional view and a plan view, respectively, of an ophthalmic lens 100 according to some other embodiments of the present disclosure.
Figure 3D:
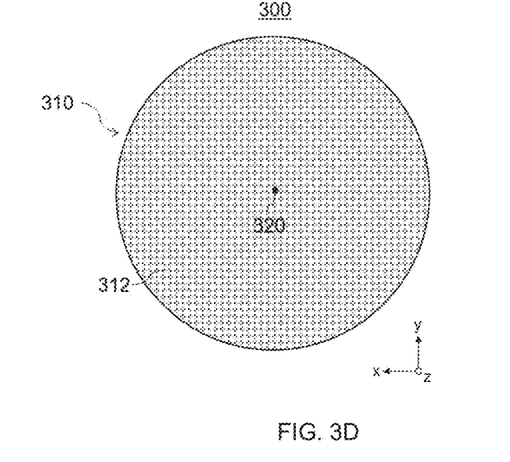

FIG. 3A and FIG. 3B are cross-sectional view and plan view, respectively, of an ophthalmic lens 300 according to some embodiments of the present disclosure. The ophthalmic lens 300 includes an optical unit 310. For example, the ophthalmic lens 300 may be the optical unit 310 itself. The optical unit 310 includes a first surface 311 and a second surface 312 that are substantially both centered by an optical axis 320 and opposed to each other. For example, the first surface 311 may be substantially convex as an object-side surface (also referred to as a front surface), and the second surface 312 may be substantially concave as an eye-side surface (also referred to as a rear surface). The first surface 311 is defined by a superposition of a base sag profile and a perturbation sag profile, whereas the second surface 312 is defined only by another base sag profile. For example, the base sag profile may appear spherical or aspherical. FIG. 3C and FIG. 3D are cross-sectional view and plan view, respectively, of an ophthalmic lens 300 according to some other embodiments of the present disclosure. As shown, the second surface 312 is defined by a superposition of a base sag profile and a perturbation sag profile, whereas the first surface 311 is defined only by another base sag profile. As an alternative embodiment, both the first surface 311 and the second surface 312 may be defined by the superposition of the respective base sag profiles and the perturbation sag profiles. It shall be appreciated that the optical unit 310 is designed (e.g., without the contribution of the perturbation sagittal profile) to provide a base diopter for correcting myopia of the wearer.

The surface profile defined by the superposition of the base sag profile and the perturbation sagittal profile may be described as the following equation (1):

$$Z(x,y) = Z_{base}(x,y) + Z_{perturbation}(x,y) \quad (1);$$

where x and y refer to x and y coordinate values (in a unit of mm) of each point on the corresponding surface on a Cartesian coordinate system that takes the optical axis 320 as a z-axis, respectively; $Z(x, y)$ refers to a surface sag (in a unit of μm) of said each point; $Z_{base}(x, y)$ refers to a base sag (in a unit of μm) of said each point; and $Z_{perturbation}(x, y)$ refers to a perturbation weight (in a unit of μm) of said each point.

The x-axis direction and the y-axis direction are not particularly limited as long as they satisfy the right-hand rule of the Cartesian coordinate system. Exemplarily, the x-axis direction may be horizontal under a case of wearing the ophthalmic lenses, and is namely a direction substantially parallel to the direction of the line connecting the eyes.

$Z_{base}(x, y)$ may be expressed as:

$$Z_{base}(x, y) = \frac{vr^2}{1 + \sqrt{1 - (1+k)v^2 r^2}} + a_4 r^4 + a_6 r^6; \quad (2)$$

where r refers to $\sqrt{x^2 + y^2}$ serving as a radial distance (in a unit of mm) from the optical axis; v refers to a base curvature of the corresponding surface; k refers to a cone constant; and $a_4$ and $a_6$ refer to a fourth order coefficient and a sixth order coefficient, respectively.

Although the equation (2) describes the base sag profile of the aspherical surface in general, the equation (2) may be configured as the spherical surface by choosing k, $a_4$ and $a_6$ to all be zero.

$Z_{perturbation}(x, y)$ may be defined by a perturbation characteristic sag function and a perturbation weighting function. In some embodiments, $Z_{perturbation}(x, y)$ may be expressed as:

$$Z_{perturbation}(x,y) = Sag(x,y) \times Weight(x,y) \quad (3);$$

where $Sag(x, y)$ refers to the perturbation characteristic sag (in a unit of μm); and $Weight(x, y)$ refers to the perturbation weight of said each point.

$Sag(x, y)$ may be expressed as:

$$Sag(x,y) = H \cdot Z_p^{1D}(x) \cdot Z_p^{1D}(y) \quad (4a)$$

where H refers to an adjustment parameter for perturbation amplitudes (in a unit of μm); and $Z_p^{1D}(\ )$ refers to a one-dimensional perturbation function whose mathematical expression is:

$$Z_p^{1D}(\delta) = \frac{\text{sign}\left(\sin\left(\frac{\pi\delta}{T}\right)\right)+1}{2} \int_0^{\rho(\delta)} \text{sign}\left(\sin\left(\frac{\pi\delta}{T}\right)\right) \cdot C(-\rho(\delta)) \cdot \rho(\delta) \cdot d\delta + \quad (4b)$$

$$\frac{-\text{sign}\left(\sin\left(\frac{\pi\delta}{T}\right)\right)+1}{2} \int_0^{\rho(\delta)} -\text{sign}\left(\sin\left(\frac{\pi\delta}{T}\right)\right) \cdot C(\rho(\delta)) \cdot \rho(\delta) \cdot d\delta$$

where δ refers to an independent variable of $Z_p^{1D}()$; sin( ) refers to a sinusoidal function; sign( ) refers to a symbolic function; T refers to a spatial period of perturbation (in a unit of mm); ∫ refers to an integral sign, and d refers to a differential sign; ρ(δ) is defined by:

$$\rho(\delta) = \frac{\delta}{T} - \left\lfloor \frac{\delta}{T} \right\rfloor \quad (4c)$$

where $\lfloor \ \rfloor$ refers to a floor function;
a mathematical expression of the function C( ) is:

$$C(\sigma) = k \cdot \left[ w^2 \cdot \sigma^{\frac{2}{\gamma}} / \varepsilon^4 - 1/\varepsilon^2 \right] \cdot e^{\frac{w^2 \cdot \sigma^{\frac{2}{\gamma}}}{2\varepsilon^2}} \quad (4d)$$

where σ refers to an independent variable of C( ); k refers to a magnitude of an amplitude (unitless) for controlling an integral kernel in the equation (4b); w, γ and ε refer to parameters (unitless) for controlling relative positions and relative amplitude of peaks and valleys in a profile defined by Sag(x, y); and e refers to a natural constant.

In a specific embodiment, H may fall within a value range from about 5 μm to about 10 μm, T may fall within a value range from about 0.8 mm to about 2 mm, k may fall within a value range from about −2 to about 2, w may fall within a value range from about 3 to about 7, γ may fall within a value range from about 0.1 to about 1, and ε may fall within a value range from about 0.8 to about 1.2.

Weight(x, y) may be expressed as the following equation (5):

$$\text{Weight}(x, y) = 0.5 \cdot \tanh\left[ \frac{\sqrt{x^2 + y^2} - a}{b} \right] - 0.5 \cdot \tanh\left[ \frac{\sqrt{x^2 + y^2} - c}{a} \right]; \quad (5)$$

where tanh( ) refers to a hyperbolic tangent function; and a, b, c and d are parameters (unitless) for controlling the perturbation weight.

In a specific embodiment, a may fall within a value range from about 0.5 to about 5, b may fall within a value range from about 0.5 to about 4, c may fall within a value range from about 10 to about 20, and d may fall within a value range from about 0.5 to about 4.

In the improved ophthalmic lens for preventing progression of myopia according to the present disclosure, a perturbation to the phase distribution of light waves in space may be generated by an optical unit having a continuous surface based on at least some of the foregoing features, which enables the perturbed light waves to pass through the optical system of the eye and form a continuous competing defocus signal in a proximal space (e.g., the front of the retina) of the retina near the main visual axis (e.g., the fovea region), thereby achieving the effect of suppressing or slowing down the progression of myopia (i.e., the deepening of myopia). Meanwhile, by reasonably selecting the parameters of the perturbation sag profile and adjusting the perturbation spatial period, perturbation amplitudes, and sizes and relative positions of peaks and valleys for the perturbation, the perturbed light waves can produce the aforementioned defocus signal, and a ghost-free (or ghost-reducing) imaging signal can still be generated in the fovea region of the retina, such that the near-vision fatigue of myopic patients wearing the eye lenses can be significantly reduced.

The experimental examples will be described in detail below in conjunction with the specific example of the present disclosure and comparative examples for performance comparison.

Example 1

A spectacle lens for preventing progression of myopia according to the Example 1 of the present disclosure is prepared based on the design of the parameters illustrated in Table 1 below, where only the front surface employs a superposition of the base sag profile and the perturbation sag profile based on the parameters in Table 1 below.

TABLE 1

| Parameters | Values |
| --- | --- |
| Refractive index of lens material | 1.55 |
| Radius of optical unit | 20 mm |
| H | 8.6 μm |
| T | 1.5 mm |
| k | −0.5 |
| w | 5 |
| γ | 0.2 |
| ε | 1 |
| a | 2.5 |
| b | 2 |
| c | 11 |
| d | 0.8 |
| v | 1/136.60 mm |
| k | 0.3 |
| $a_4$ | 0 |
| $a_6$ | 0 |

Comparative Example 1

A conventional mono-optic spectacle lens according to the Comparative example 1 is prepared with essentially the same parameters as the spectacle lens according to the Example 1 except for that the front surface merely adopts the same base sag profile (i.e., having the same parameters such as refractive index of lens material, radius of optical unit, v, k, $a_4$ and $a_6$) as the Example 1 with no perturbation sag profile further applied.

Comparative Example 2

An existing spectacle lens for preventing progression of myopia according to the Comparative example 2 is prepared with essentially the same parameters as the spectacle lens according to the Example 1 except for that the front surface adopts the same base sag profile (i.e., having the same parameters such as refractive index of lens material, radius of optical unit, v, k, $a_4$ and $a_6$) as the Example 1 with a plurality of defocus areas in the shape of islands having respective diameters of 1.1 mm further superimposed near the center of the lens.

Experimental Example

The imaging on the retina of myopic patients when they look at a letter E (leftward opening) corresponding to the visual acuity of 20/20 (~1.0) are simulated with the spectacle lenses according to the Example 1, the Comparative example 1 and the Comparative example 2 under the same wearing and near vision conditions, respectively. The spectacle lenses are 12 mm from the cornea, and the typical spherical aberration ($Z_4^0$, OSA Standard) is 0.04 μm (6 mm pupil entry) when the eye is turned downward toward the nasal side and accommodates for near vision.

Figure 4A:
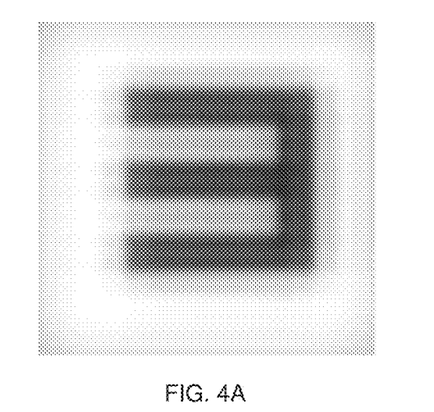
FIGS. 4A to 4C are sequentially simulated imaging views using spectacle lenses based on Example 1, Comparative example 1 and Comparative example 2, respectively.
Figure 4B:
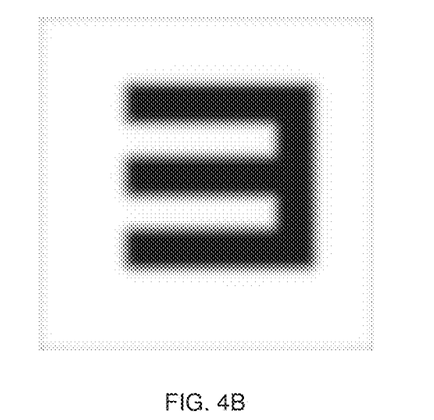
Figure 4C:
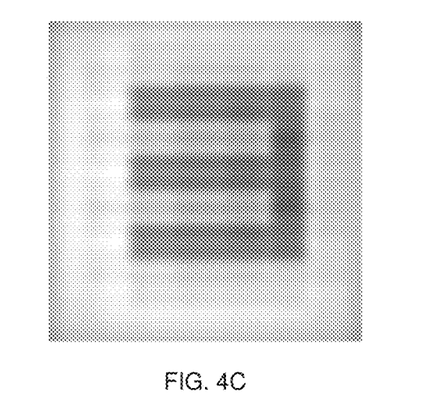

FIGS. 4A to 4C are sequentially simulated imaging views using spectacle lenses based on the Example 1, the Comparative example 1 and the Comparative example 2, respectively.

By comparing FIG. 4A and FIG. 4B, it can be confirmed that the image based on the Example 1 has a rather clear font in spite of being slightly blurry compared to the image based on the Comparative example 1, and the font exhibits an appropriate blurring at the edge (but not so much as to affect the legibility of the entire letter) because the applied perturbation sag profile produces moderate defocus images. That is, the spectacle lens according to the Example 1 is enabled to generate effective competing defocus signals on the retina under a premise of meeting the near vision needs of myopic patients, such that the progression of myopia can be suppressed or slowed down.

Furthermore, by comparing FIG. 4A and FIG. 4C, it can also be confirmed that the image based on the Example 1, compared to the image based on the Comparative example 2, is sharper, and the ghost images at the edge are smoother and has a significantly reduced degree of ghosting because the applied perturbation sag profile produces moderate defocus images. In other words, the spectacle lens according to the Example 1 not only can suppress or slow down the progression of myopia, but also can effectively reduce the ghost images when myopic patients look at the near, such that the fatigue caused by the ghost images to myopic patients when looking at the near can be suppressed or significantly reduced, and the wearing visual experience of myopic patients can be thereby effectively improved.

Figure 5:
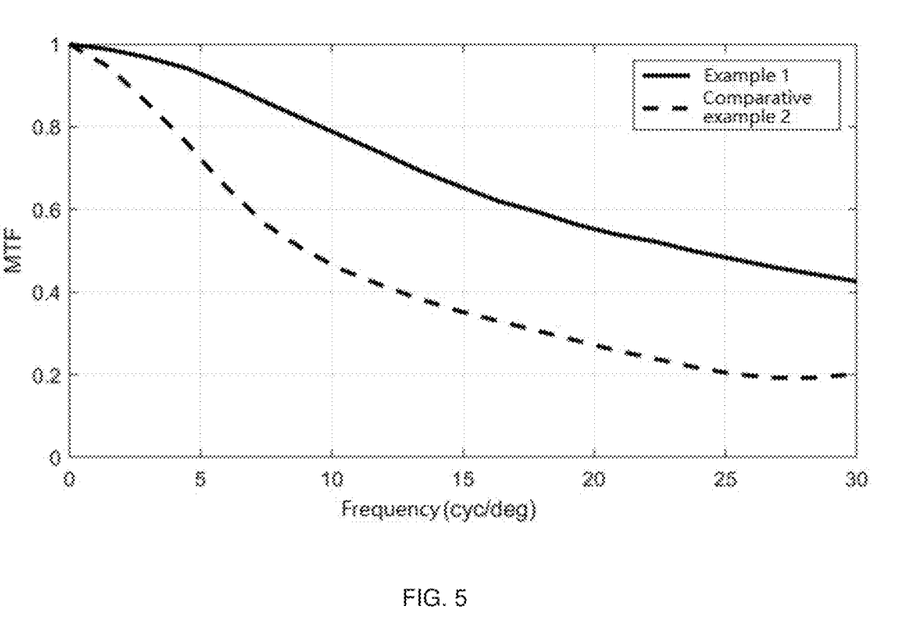
FIG. 5 shows MTF curves of spectacle lenses based on Example 1 and Comparative example 2.

In addition, MTF tests are conducted with the spectacle lenses according to the Example 1 and the Comparative example 2, respectively. FIG. 5 shows the MTF curves of the spectacle lenses based on the Example 1 and the Comparative example 2. As shown in FIG. 5, it can be confirmed that the MTF measurements based on the Example 1 are significantly higher than those based on the Comparative example 2 at all frequencies.

The terms "about" and "substantially" herein denote an amount that is equal to or close to the stated amount (e.g., an amount that still performs the desired function or achieves the desired result). For example, unless otherwise stated, the terms "about" and "substantially" may refer to the amount within (e.g., above or below) 10%, within (e.g., above or below) 5%, within (e.g., above or below) 1%, within (e.g., above or below) 0.1%, or within (e.g., above or below) 0.01% of the stated amount.

Various embodiments of the present disclosure have been described herein. Although the present disclosure has been described with reference to specific embodiments, this specification is only intended to illustrate rather than limit the present disclosure. Those of ordinary skill in the art may envisage various modifications and applications without departing from the basic idea and scope of the present disclosure.

What is claimed is:

1. An ophthalmic lens for preventing progression of myopia, comprising: an optical unit that comprises a first surface and a second surface both centered by an optical axis and opposed to each other, wherein at least one of the first surface and the second surface is defined by a superposition of a base sag profile and a perturbation sag profile, and the perturbation sag profile is defined by:

$$Z_{perturbation}(x,y) = \text{Sag}(x,y) \times \text{Weight}(x,y)$$

wherein x and y refer to x and y coordinate values of each point on the at least one surface on a Cartesian coordinate system that takes the optical axis as a z-axis, respectively; $Z_{perturbation}(x, y)$ refers to a perturbation sag of said each point; Weight(x, y) refers to a perturbation weight of said each point; and Sag(x, y) refers to a perturbation characteristic sag of said each point and is defined by:

$$\text{Sag}(x,y) = H \cdot Z_p^{1D}(x) \cdot Z_p^{1D}(y)$$

wherein H refers to an adjustment parameter for perturbation amplitudes; and a mathematical expression of a function $Z_p^{1D}(\ )$ is:

$$Z_p^{1D}(\delta) = \frac{\text{sign}\left(\sin\left(\frac{\pi\delta}{T}\right)\right)+1}{2} \int_0^{\rho(\delta)} \text{sign}\left(\sin\left(\frac{\pi\delta}{T}\right)\right) \cdot C(-\rho(\delta)) \cdot \rho(\delta) \cdot d\delta +$$
$$\frac{-\text{sign}\left(\sin\left(\frac{\pi\delta}{T}\right)\right)+1}{2} \int_0^{\rho(\delta)} -\text{sign}\left(\sin\left(\frac{\pi\delta}{T}\right)\right) \cdot C(\rho(\delta)) \cdot \rho(\delta) \cdot d\delta$$

wherein δ refers to an independent variable of $Z_p^{1D}(\ )$; sin( ) refers to a sinusoidal function; sign( ) refers to a symbolic function; T refers to a spatial period of perturbation; ∫ refers to an integral sign; and d refers to a differential sign; ρ(δ) is defined by:

$$\rho(\delta) = \frac{\delta}{T} - \left\lfloor \frac{\delta}{T} \right\rfloor$$

wherein $\lfloor \ \rfloor$ refers to a floor function;
a mathematical expression of a function C( ) is:

$$C(\sigma) = k \cdot \left[ w^2 \cdot \sigma^{\frac{2}{\gamma}} / \varepsilon^4 - 1/\varepsilon^2 \right] \cdot e^{\frac{w^2 \cdot \sigma^{\frac{2}{\gamma}}}{2\varepsilon^2}}$$

wherein σ refers to an independent variable of C( ); k refers to a magnitude of an amplitude for controlling an integral kernel in the function $Z_p^{1D}(\ )$ w, γ and ε refer to parameters for controlling relative positions and relative amplitudes of peaks and valleys in a profile defined by Sag(x, y); and e refers to a natural constant.

2. The ophthalmic lens according to claim 1, wherein $$\text{Weight}(x, y) = 0.5 \cdot \tanh\left[\frac{\sqrt{x^2+y^2}-a}{b}\right] - 0.5 \cdot \tanh\left[\frac{\sqrt{x^2+y^2}-c}{d}\right]$$

wherein tanh( ) refers to a hyperbolic tangent function; and a, b, c and d are parameters for controlling the perturbation weight.

3. The ophthalmic lens according to claim 1, wherein H falls within a value range from 5 μm to 10 μm, T falls within a value range from 0.8 mm to 2 mm, k falls within a value range from −2 to 2, w falls within a value range from 3 to 7, γ falls within a value range from 0.1 to 1, and ε falls within a value range from 0.8 to 1.2.

4. The ophthalmic lens according to claim 2, wherein a falls within a value range from from 0.5 to 5, b falls within a value range from 0.5 to 4, c falls within a value range from to 20, and d falls within a value range from 0.5 to 4.

5. The ophthalmic lens according to claim 1, wherein the base sag profile appears spherical or aspherical.

6. The ophthalmic lens according to claim 1, wherein a profile of the at least one surface is defined by:

$$Z(x,y)=Z_{base}(x,y)+Z_{perturbation}(x,y)$$

wherein $Z(x, y)$ refers to a surface sag of said each point; and $Z_{base}(x, y)$ refers to a base sag of said each point and is defined by:

$$Z_{base}(x, y) = \frac{vr^2}{1+\sqrt{1-(1+k)cv^2r^2}} + a_4 r^4 + a_6 r^6$$

wherein r refers to $\sqrt{x^2+y^2}$ serving as a radial distance from the optical axis; v refers to a base curvature of the at least one surface; k refers to a cone constant; and $a_4$ and $a_6$ refer to a fourth order coefficient and a sixth order coefficient, respectively.

7. The ophthalmic lens according to claim 6, wherein the base sag profile appears spherical when k, $a_4$ and $a_6$ are all zero.

8. The ophthalmic lens according to claim 1, wherein the optical unit has a base diopter for correcting myopia of a wearer.

9. The ophthalmic lens according to claim 1, wherein the first surface is substantially convex, and the second surface is substantially concave.

10. The ophthalmic lens according to claim 1, wherein one of the first surface and the second surface is defined by a superposition of the base sag profile and the perturbation sag profile, and the other is defined only by another base sag profile.

11. The ophthalmic lens according to claim 1, wherein the ophthalmic lens is adapted to be disposed on a spectacle lens.

12. Spectacles, comprising a spectacle frame and a spectacle lens fitted to the spectacle frame, wherein the spectacle lens uses an ophthalmic lens according to claim 1.

13. The spectacles according to claim 12, wherein the first surface is a front surface, and the second surface is a rear surface.

* * * * *